May 13, 1969   D. B. ERSKINE   3,444,078
CARBON REMOVAL
Filed Dec. 9, 1966

INVENTOR
DONALD B. ERSKINE

BY *Cushman, Darby & Cushman*
ATTORNEYS

United States Patent Office 3,444,078
Patented May 13, 1969

3,444,078
CARBON REMOVAL
Donald B. Erskine, Coraopolis, Pa., assignor, by mesne assignments, to Calgon Corporation, a corporation of Delaware
Filed Dec. 9, 1966, Ser. No. 600,608
Int. Cl. C02b 1/76; B01d 15/06
U.S. Cl. 210—33                                      3 Claims

ABSTRACT OF THE DISCLOSURE

A carbon filter supported on a gravel underdrain. The carbon is removed from the filter via gutters within the gravel. The carbon is removed in the form of a slurry by first draining then by backwashing and finally by washing the gutters.

---

This invention relates to purification of water supplies with activated carbon and particularly to a process of removing the carbon.

The purification of water, especially water intended for home consumption, has become a difficult problem in recent years as a result of the increased pollution of rivers and streams which serve as the source of the water. While it is generally possible to decontaminate this polluted water, making it safe for human consumption, the resulting purified water still contains disagreeable tastes, odors and turbidity. As the degree of pollution of the water source increases, the disagreeable tastes, odors and turbidity of the purified water correspondingly increase, and in many localities the city water has become extremely unpalatable.

It has recently been proposed to use activated carbon in water purification processes to remove these disagreeable characteristics of water taken from polluted sources. The process involves the use of conventional sand-filtering equipment wherein the sand is replaced with activated carbon which is supported by a gravel underdraining system. In association, the activated carbon filters require regeneration equipment whereby the activated carbon is periodically removed from the filters, conveyed to a regeneration furnace and subsequently returned to the filters.

Since activated carbon is far more expensive than sand, the activated carbon must be conserved. It is therefore important that the carbon not be intermixed with gravel from the underdraining system which would reduce the unit weight efficiency. Furthermore, since the efficiency of filtration and adsorption of impurities from the water depends on the percentage of activated carbon that has been regenerated, it is important that as much of the activated carbon as possible be removed from the filters for regeneration.

In prior processes, the activated carbon has been removed by simply draining the filters. This method required that the filters only be partially drained in order to minimize mixing with the gravel from the underdraining system, and that the remaining activated carbon be carefully and laboriously removed by manual labor. The prior practices have been, therefore, very time-consuming and expensive.

It is therefore an object of the present invention to provide an improved process for removing activated carbon from filters, whereby the percentage of activated carbon that can be removed for regeneration is greatly increased and without substantial manual labor. It is a further object to provide a novel process of removing activated carbon from filters without substantial intermixing thereof with gravel from the underdraining system. Other objects will be apparent from the following disclosure.

Broadly stated, the above objects are accomplished by providing passageways or gutters within the gravel underdraining system, the walls of the gutter extending at least to the top of the gravel underdraining system and positioned in such a manner as to substantially reduce the amount of carbon remaining after a series of draining, backwashing and flushing steps are performed.

Referring to the drawings, FIGURE 1 is a top view of a filter according to the present invention.

Figure 1:
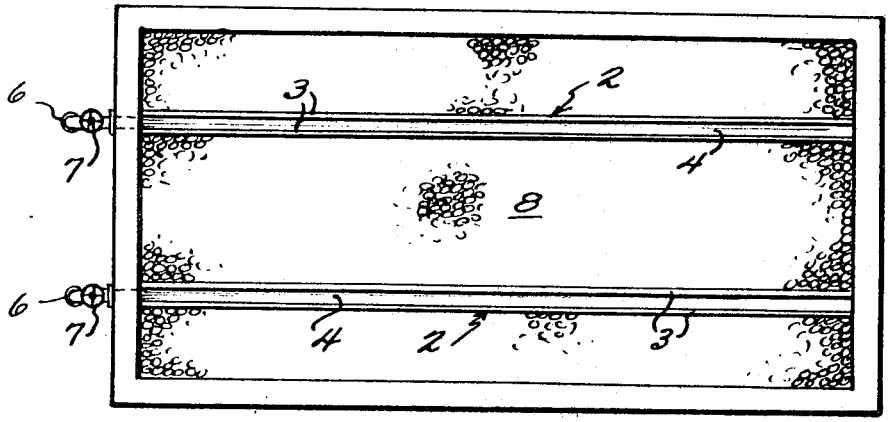
Figure 2:
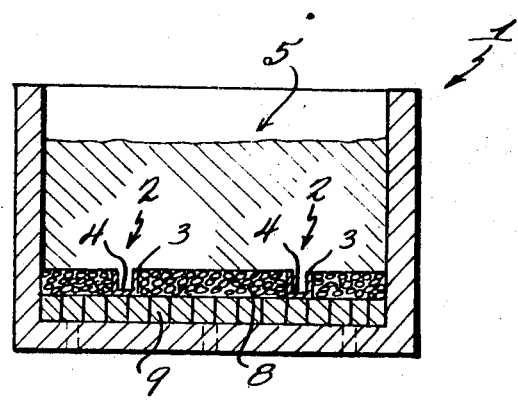
FIGURE 2 is a sectional view of the filter.

Referring to FIGURES 1 and 2, there is shown a filter bed designated generally by 1, gutters 2 having sidewalls 3 and bottom walls 4, and a bed of activated carbon 5 within the filter. The filter is provided with drain discharge ports 6 upon which suitable discharge valves 7 are disposed. The discharge valves are connected to a common collecting launder (not shown) wherein the activated carbon is transported to a suitable regeneration furnace. The carbon bed is supported on a gravel underdraining system having beds of gravel 8 and a conventional support 9 which is capable of passing water therethrough. Conventionally, these supports are porous or perforated members with a collecting container, suitably valved, disposed thereunder.

As in a conventional manner, water to be processed is passed from the top of the filter, through the activated carbon bed 5, through the gravel underdraining system 8, and through the conventional support system 9.

Periodically, the activated carbon must be removed for regeneration. According to the present invention, the support 9 is valved off in the conventional manner, the discharge valves 7 are opened and the activated carbon bed is drained, resulting in removal of a portion of the activated carbon. After draining is accomplished, a backwashing with water is performed by flowing water through the support 9 and gravel underdraining system 8 into the activated carbon bed 5 at a flow rate of water whereby the remaining activated carbon is completely submerged and additional activated carbon is removed from the filter via discharge valve 7. The filter is then again drained and the gutters flushed with water to remove activated carbon remaining on the walls and on the top of the walls of the gutters. This flushing of the gutters may be accomplished with water jets located in the gutters or by hand with a water hose. The above procedure may be repeated one or more times until the activated carbon remaining in the filter is reduced to an acceptable amount.

It is to be understood, that the activated carbon, useful as adsorption agents in water purification filters, is of the granular variety having in general a particle size of 12 to 40 mesh. It is also to be understood that the activated carbon is removed from the filters in the form of a slurry.

The gutters used in the filter are formed with wood or other water-resistant materials. While the gutters may have any desired cross section which has an opened upper portion not less than the width of the gutters, it is preferable that the gutters be in the form of an opened top rectangle. The gutters are spaced from each other a distance of from about 8 to 12 times the inside width of the gutters. Hence, for example, gutters having inside widths of 8 inches should be spaced apart 64 to 96 inches. However, it will be appreciated that the gutters closest to the walls of the filter will be one-half of this distance from the said wall. The depth of the gutters are approximately equal to the width of the gutters, although other dimensions may be used. The gutters are sloped toward the discharge valves and have a slope of from $\frac{1}{16}$ to $\frac{1}{4}$ inch per foot. When gutters are over about 30 feet in length, it is preferable that conventional water jets be placed in the gutters to assist in moving the slurried activated carbon toward the discharge valves.

The above-described arrangement of gutters provides a filter wherein a greater proportion of the activated carbon contained in the filters may be removed without a significant sacrifice of available filter surface area and without significant mixing of gravel in the activated carbon.

Figure 3:
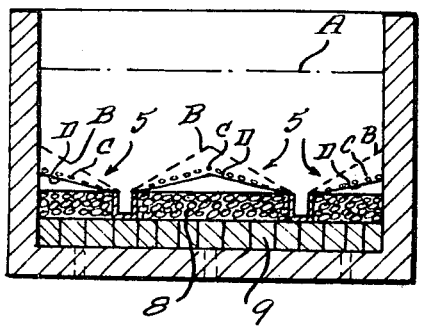
FIGURE 3 is a diagrammatic representation of the progress of carbon removal during the steps of the present process.

By use of the present process, and the present filter configuration, the angle of repose of the activated carbon remaining in the filter is reduced, whereby the total amount of activated carbon remaining in the filter is correspondingly reduced. This concept is best illustrated in FIGURE 3 which is a diagrammatic illustration of the activated carbon removal during the processing steps. At the start of the process, the level of the activated carbon bed is at A. After the first draining step, the level of the bed is at B. No more activated carbon can be removed by a draining operation as the angle of repose has been established. After the first backwashing step, the level of the bed is at C. After the flushing step, the level of the bed is at D. The flushing step removes activated carbon clinging to the gutter walls and top of the gutters. Removing the carbon from the top of the gutters causes a resulting change in the angle of repose of the carbon bed and the removal of additional activated carbon. By repeating the above procedure, the amount of activated carbon remaining in the filter may be further reduced.

The following example illustrates the above process. However, the present invention is not limited to the example, but only to the claims which follow hereafter.

Example

A filter of the design as shown in FIGURE 1 was constructed. The width of the filter was 13 feet 6 inches, and the length was 28 feet. There were two gutters 8 inches in depth and width disposed therein. The gutters were 3 feet 4 inches from the walls and 6 feet 10 inches apart. An activated carbon bed 5 feet deep was supported on an 8-inch deep gravel underdraining. The gutter walls and bottom were constructed of wood. The gutters were sloped toward the discharge valves with a slope of ⅛ inch per foot. Water was purified by passing the water from the top of the filter through the bottom support thereof. After the activated carbon had been in use for six days, the carbon required regeneration. The flow of the water to the filter was stopped, and the bottom support was valved off in a conventional manner. The filter was drained, whereupon activated carbon was removed through the discharge valves as a slurry. The resulting angle of repose of the activated carbon remaining in the filter was 29° above the horizontal. The discharge valves were closed and the filter filled with water via the bottom support. The discharge valves were opened and the filter was backwashed by passing water through the bottom support and gravel underdraining system until no more carbon could be removed. During the backwashing, the activated carbon was submerged under the water. The filter was then drained via the discharge valves and the activated carbon remaining in the filter had an angle of repose of 12° above the horizontal. The walls, top, and bottom of the gutters were flushed with a hand hose whereby additional activated carbon was removed. The angle of repose of the activated carbon remaining in the filter was 10° above the horizontal. The carbon removed from the filter was substantially free of gravel. The gravel was prevented from significant mixing with the activated carbon due to its greater density and being retained during the process steps by the gutter walls. Upon subsequent regeneration, the activated carbon was returned to the filter for further use in water purification.

It can be seen from the above example that the present invention substantially reduces the amount of activated carbon remaining in a filter subsequent to a removal operation, that there is substantially no mixing thereof with gravel from the underdraining system, and that the removal operation is quick, simple and requires very little manual labor.

What I claim is:

1. A process for removing in the form of a slurry granular activated carbon from a water purification filter, said filter comprising a bottom support capable of passing water therethrough, side discharge means through which the activated carbon slurry is removed from the filter, a gravel underdraining means, a bed of activated carbon disposed upon said underdraining means, and gutters disposed within said underdraining means, comprising draining the activated carbon and water associated therewith whereby the activated carbon remaining in the filter establishes a first angle of repose, backwashing the remaining activated carbon with water being passed through the said support and underdraining means until additional activated carbon cannot be removed, whereby the activated carbon remaining in the filter establishes a second angle of repose, and washing with water the said gutters whereby the activated carbon remaining in the filter establishes a third angle of repose.

2. The process according to claim 1 wherein the said angles of repose decrease with each step of the process.

3. The process of claim 1 wherein the backwashing step is carried out with a rate of water flow sufficient to keep the activated carbon submerged under the water.

References Cited

UNITED STATES PATENTS 2,679,319  5/1954  Walker _____ 210—275

FOREIGN PATENTS 721,181  12/1954  Great Britain.

SAMIH N. ZAHARNA, Primary Examiner.

U.S. Cl. X.R.

210—35, 82, 290